J. FRIC.
SELF PROPELLED HEADING AND THRASHING HARVESTER.
APPLICATION FILED OCT. 18, 1918.

1,405,774.

Patented Feb. 7, 1922.
6 SHEETS—SHEET 2.

Inventor
J. Fric
By H. R. Kerslake
Attorney

J. FRIC.
SELF PROPELLED HEADING AND THRASHING HARVESTER.
APPLICATION FILED OCT. 18, 1918.

1,405,774.

Patented Feb. 7, 1922.
6 SHEETS—SHEET 3.

Inventor
J. Fric.
By H. R. Kerslake
Attorney

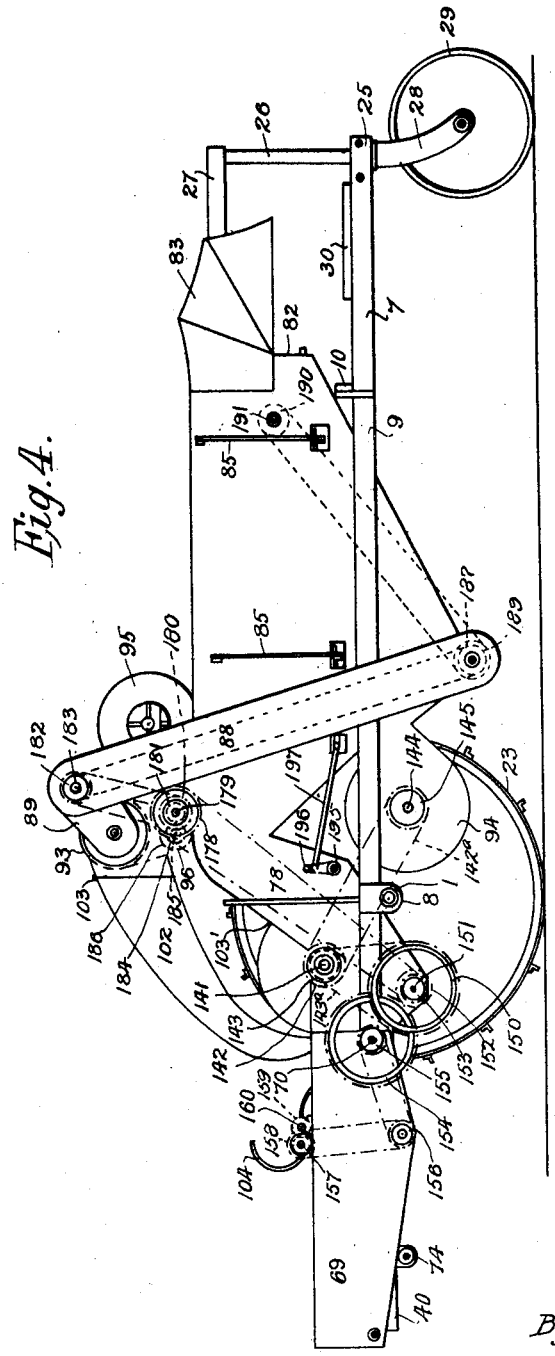

J. FRIC.
SELF PROPELLED HEADING AND THRASHING HARVESTER.
APPLICATION FILED OCT. 18, 1918.
1,405,774.
Patented Feb. 7, 1922.
6 SHEETS—SHEET 5.
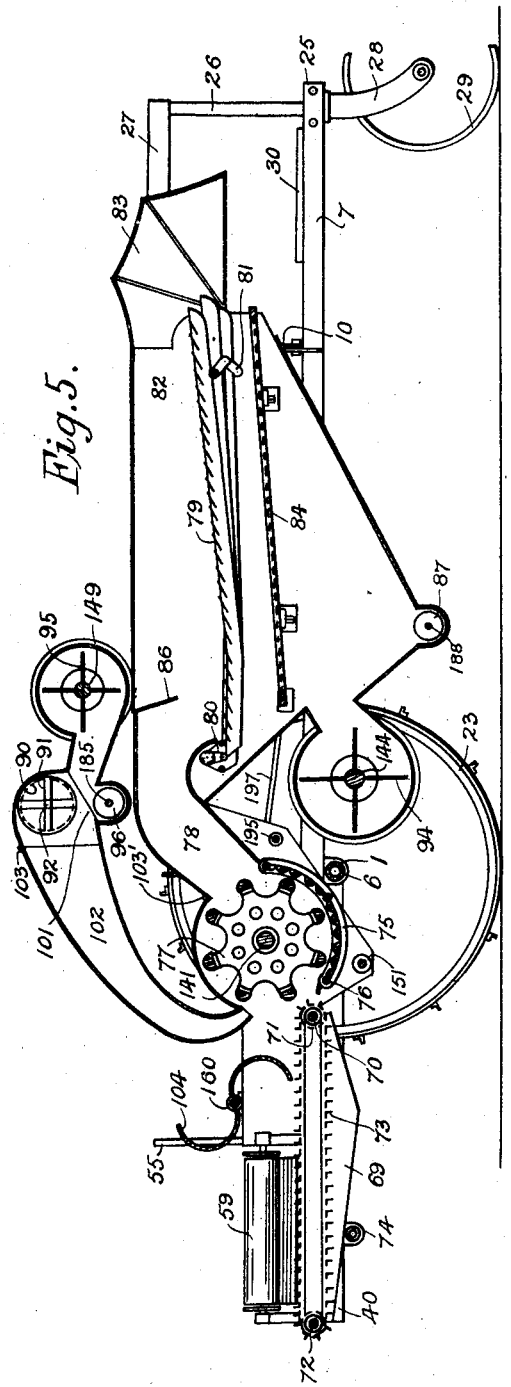
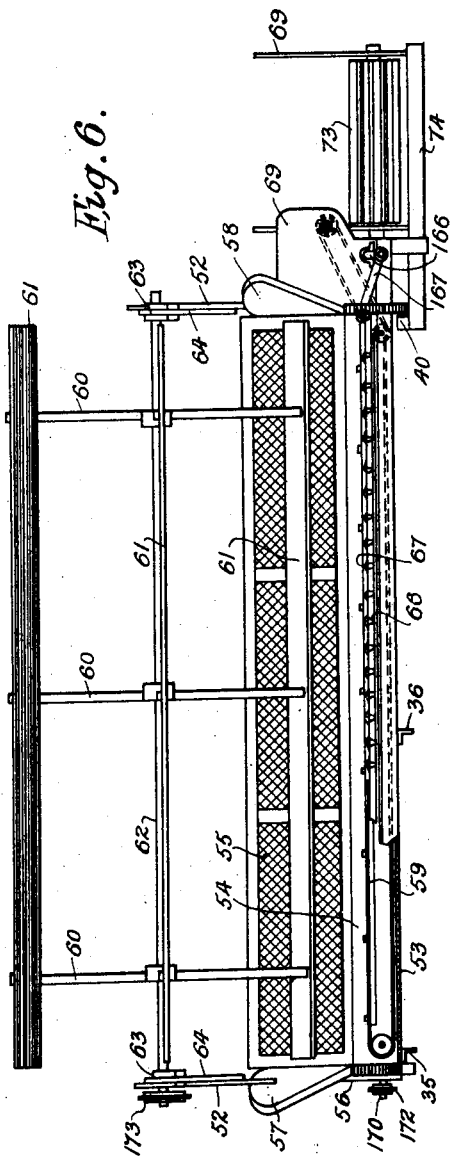
Inventor
J. Fric
By H. R. Kerslake
Attorney J. FRIC.
SELF PROPELLED HEADING AND THRASHING HARVESTER.
APPLICATION FILED OCT. 18, 1918.
1,405,774.
Patented Feb. 7, 1922.
6 SHEETS—SHEET 6.
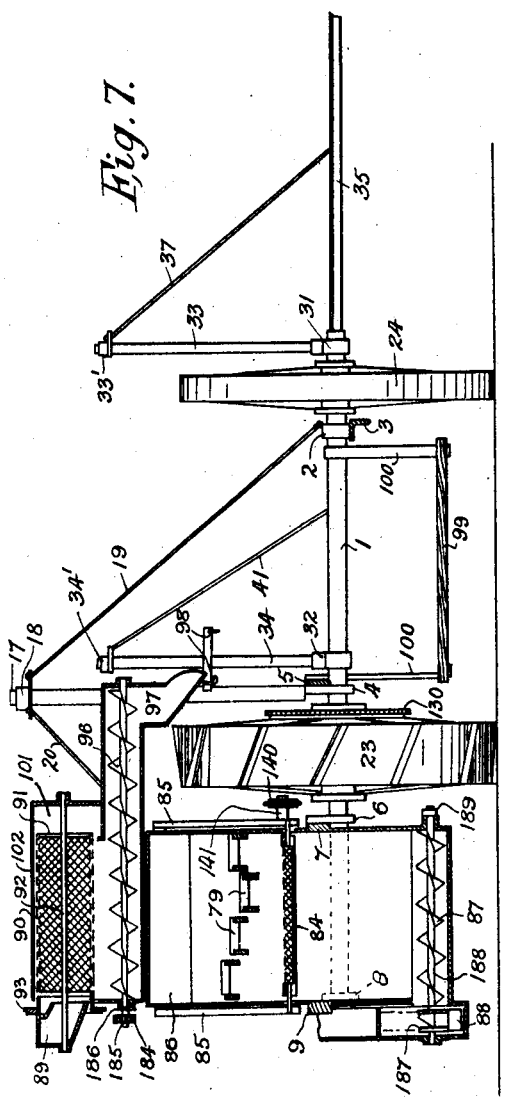
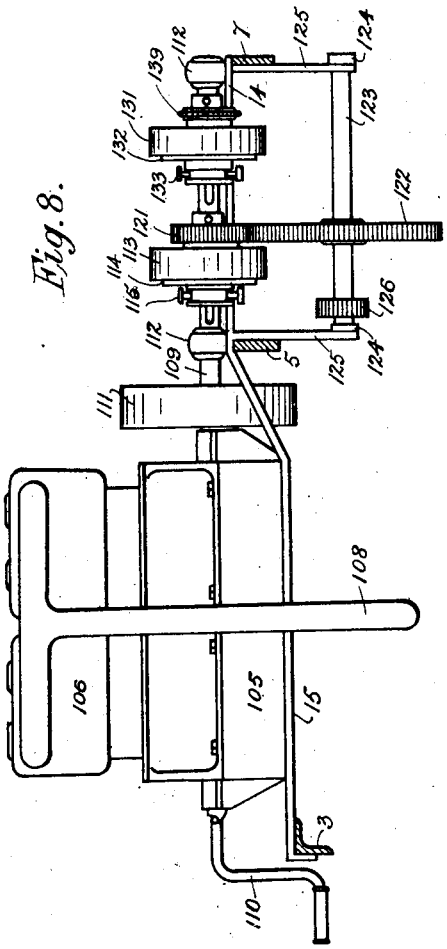
Inventor
J. Fric
By H. R. Kerslake
Attorney

UNITED STATES PATENT OFFICE.

JOSÉ FRIC, OF PIGÜÉ, BUENOS AIRES, ARGENTINA.

SELF-PROPELLED HEADING AND THRASHING HARVESTER.

1,405,774.   Specification of Letters Patent.   Patented Feb. 7, 1922.

Application filed October 18, 1918. Serial No. 258,728.

*To all whom it may concern:*

Be it known that I, JOSÉ FRIC, citizen of Argentina, residing at Pigüé, Province of Buenos Aires, Argentina, have invented new and useful Improvements in Self-Propelled Heading and Thrashing Harvesters, of which the following is a specification.

The present invention relates to a combined heading and thrashing motor harvester and has for its main object to provide a machine of this kind, simple in construction and economical in working, and capable of carrying out the operations of cutting the heads and thrashing rapidly and efficiently.

Another of the objects of the present invention is a combined heading and thrashing motor harvester, the cutting parts of which are capable of being regulated as regards their height and angle of inclination and in which the parts which serve as conveyors to the thrasher follow the former in their various inclinations.

A further object of the present invention is to furnish a thrasher of light and simple construction supported on a wheeled framework, which framework also carries the cutting machinery.

Another object of the present invention is to provide a machine of the kind specified which permits of the definite bagging of the thrashed grain.

A further object of the invention is to provide a motor operated heading and thrashing mechanism with clutch or coupling means so that the driving means which propel the machine may be operated independently of the driving mechanism for the heading and thrashing means or vice versa.

Having in view the foregoing objects and others which will be brought to notice in the course of the present specification, the invention consists essentially in the new combination of parts and appliances as will be hereinafter specified and which will be claimed in the clauses hereto appended.

In order that the invention may be clearly understood and easily used, it has been represented in the form most likely to be preferred, in the attached drawings, wherein:—

Figure 4 is a left hand side view of the machine.

Figure 5 is a longitudinal section of the machine along the line C—D of Figure 1.

Figure 6 is a front view of the machine.

Figure 7 is a cross section of the machine, across the thrasher and the cleaners.

Figure 8 is a cross section of the same machine on a larger scale, along the line of the motors.

In all the figures referred to the same reference numbers are used to indicate the same or corresponding parts.

Figure 1:
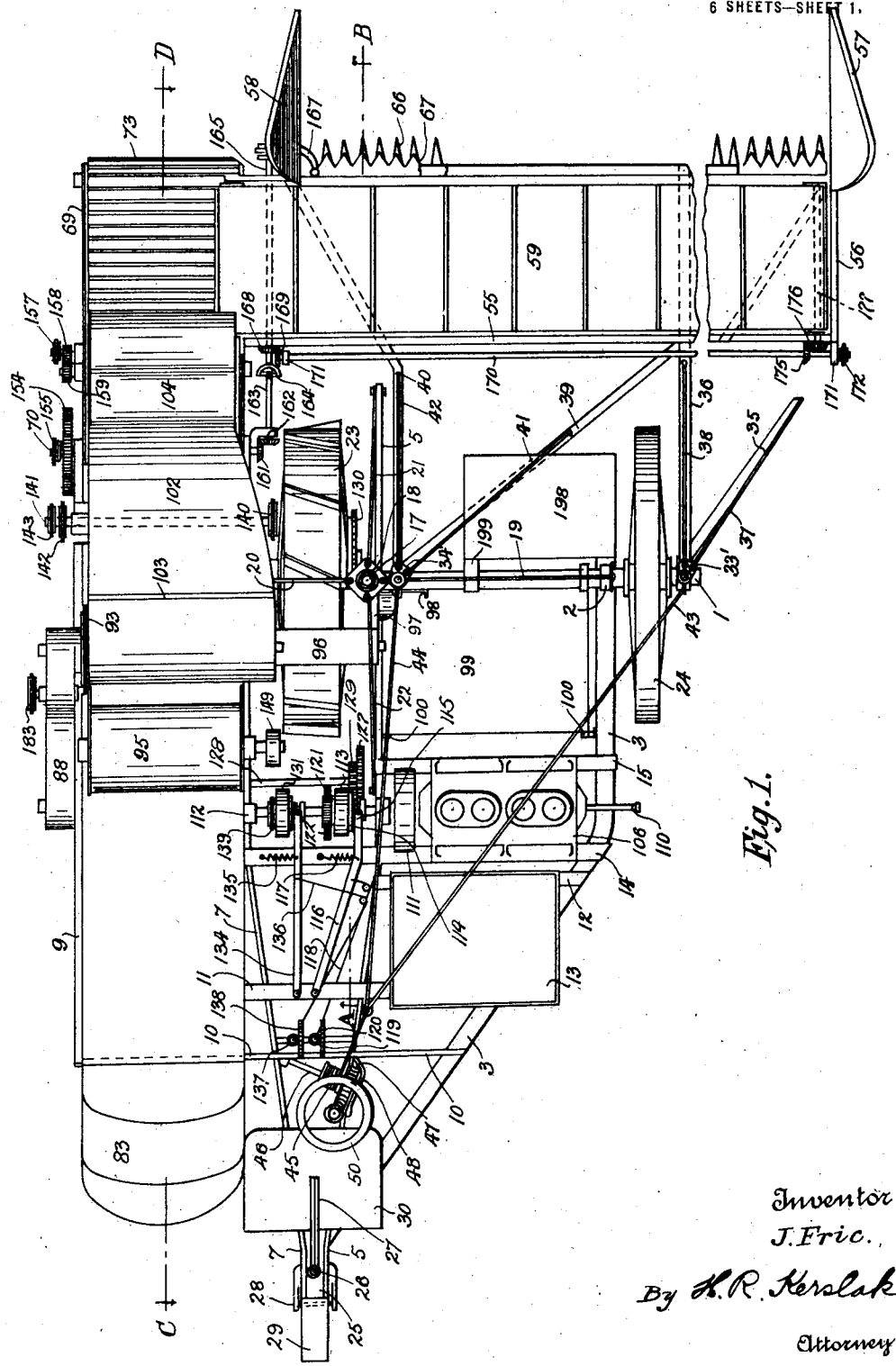
Figure 1 is a top plan view of the complete machine, some of the parts having been omitted for the sake of greater clearness.

Referring now to the machine as a whole, 1 represents a fixed transverse axle, tubular by preference, upon which are mounted in such a manner as to permit of free revolution, the motor wheel 23 and the wheel 24 which wheels support the machine.

Near one of the extremities of the axle 1 is fixed a sleeve 2 on the lower side of which is fixed a bar of angle-iron 3 which extends to the back of the machine where it joins the bars 5 and 7 which will be referred to in due course.

On the same axle is mounted a second sleeve 4 which supports another bar 5 of flat-iron which extends in front of the axle 1 and terminates at the back part of the machine at the steering-wheel. 6 represents another sleeve also fixed to the tubular axle 1 and which has affixed to its upper part another bar 7 which extends to the back of the machine where in conjunction with the bar 5 it forms the bearing for the vertical axle of the steering-wheel, which will be referred to in due course.

Another sleeve 8 is adjusted on the opposite extremity of the axle 1 and carries on its upper part a bar 9 which stretches to the back of the thrashing machine as will subsequently be shown. The rear end of this bar 9 is connected with the bar 3 by means of a cross-tie 10 which serves to complete the frame of the machine and give it the rigidity required.

11 and 12 represent cross-ties fixed between the bars 3 and 7 and serve to support a water-tank 13 which contains the water necessary for cooling the motor.

14 and 15 designate cross-pieces which stretch from the bar 3 to bars 7 and 5 respectively and serve to support the body of the motor proper.

Mounted on the sleeve 4 is a pillar 17, on the upper portion of which is another sleeve 18 from which stretch at right angles four ties; the first of these 19 joins the upper sleeve referred to with the bar 3, the second 20 joins the sleeve 18 with the upper portion of the box corresponding to the drum of the thrasher with the object of supporting from above the body of the thrasher, which as will be seen later is hardly supported by the bars of the machine. The third of these ties 21 joins the sleeve 18 with the free forward extremity of the bar 5 and finally the fourth 22 joins it with the same bar 5 towards the rear. The two ties last referred to serve essentially to keep the pillar 17 in a vertical position, while the other two are intended to give rigidity to the framework of the machine.

On the axle 1, and in such a manner that it can revolve about it, is mounted the motor-wheel 23 between the sleeves 4 and 6, and on the free end of the said axle 1, beside the sleeve 2 of the outside bar 3 is mounted in a manner which permits of its revolving, the supporting wheel 24. As may be clearly seen in Figure 7, the weight of the thrasher and of the parts accessory to the same are placed on one side of the machine, outside of the wheels referred to, and in order to balance the weight of the apparatus the motor and its accessories are placed at the opposite side of the machine as may be clearly seen in the said figure.

At the rear of the machine at the point of conjunction of the bars 3, 5 and 7 is a vertical bearing 25 through which turns the shaft 26 of the steering-wheel. This shaft carries on its upper part a horizontal lever 27 placed at an appropriate height and within convenient reach of the conductor of the machine in order to allow the conductor of the machine to reach and move the said lever, the conductor of the machine being stationed on the platform 30 which is sustained by the bars referred to as may be seen in the accompanying figures. This same shaft terminates at its lower end, beneath the bearing 25 in a fork 28 in which is mounted the steering-wheel 29 which may be of any convenient design.

As may be seen from the foregoing the general framework of the machine formed by the bars and cross-ties described and the additional pieces which reinforce them, is mounted upon three wheels, one motor-wheel 23, one supporting-wheel 24 fixed on the same axle as the former and of the same diameter and a rear steering-wheel 29 of inferior diameter, all in such a manner that the framework of the machine remains on a horizontal plane.

The framework of the machine having thus been described, the section of the same intended for cutting the head will now be specified, together with the parts accessory thereto and their connection with the general framework of the machine.

On the axle 1 are fixed two sleeves 31 and 32, capable of revolving about the said axle and which are constructed integral with two substantially vertical pillars 33 and 34 respectively. The pillers referred to carry on their upper parts the sleeves 33' and 34' with the object which will be explained later. From the sleeve 31 stretch two girders 35 and 36 arranged substantially at right angles to the pillar 33 and which extends from the same towards the forward portion of the machine. In the same manner, from the sleeve 32 stretch two girders 39 and 40, all these girders terminating on the same transverse line of the machine, which line corresponds to the forward edge of the reaper proper. From the sleeve 33' run the ties 37 and 38 which are connected respectively to the girders 35 and 36 and in the same manner from sleeve 34' fixed to the upper end of the pillar 34 stretch other two ties 41 and 42 which are affixed to the girders 39 and 40 before the latter form the frame of the reaper. As will be readily understood the frame formed by the girders referred to is capable of adjustment about the axle 1. To accomplish this adjustment cables 43 and 44 have their front ends secured to the said sleeves 33' and 34', and their rear ends connected to a rotatable drum 45 mounted on a shaft 46 which turns in the bearings 47, fixed upon the bars forming the framework of the machine. Fixed to the shaft 46 is a worm wheel 48 which engages with a screw 49 fixed on the shaft of a hand-wheel 50 that is within reach of the conductor and by means of which is regulated at will the angle of inclination of the forward part of the apparatus. This will permit the combs and knives of the reaper, which will be referred to later, to be adjusted relatively to the level of the heads which the machine is required to cut. This facility of regulating the height, which must necessarily vary in different fields and even in the same field constitutes one of the advantages of the present invention.

Figure 2:
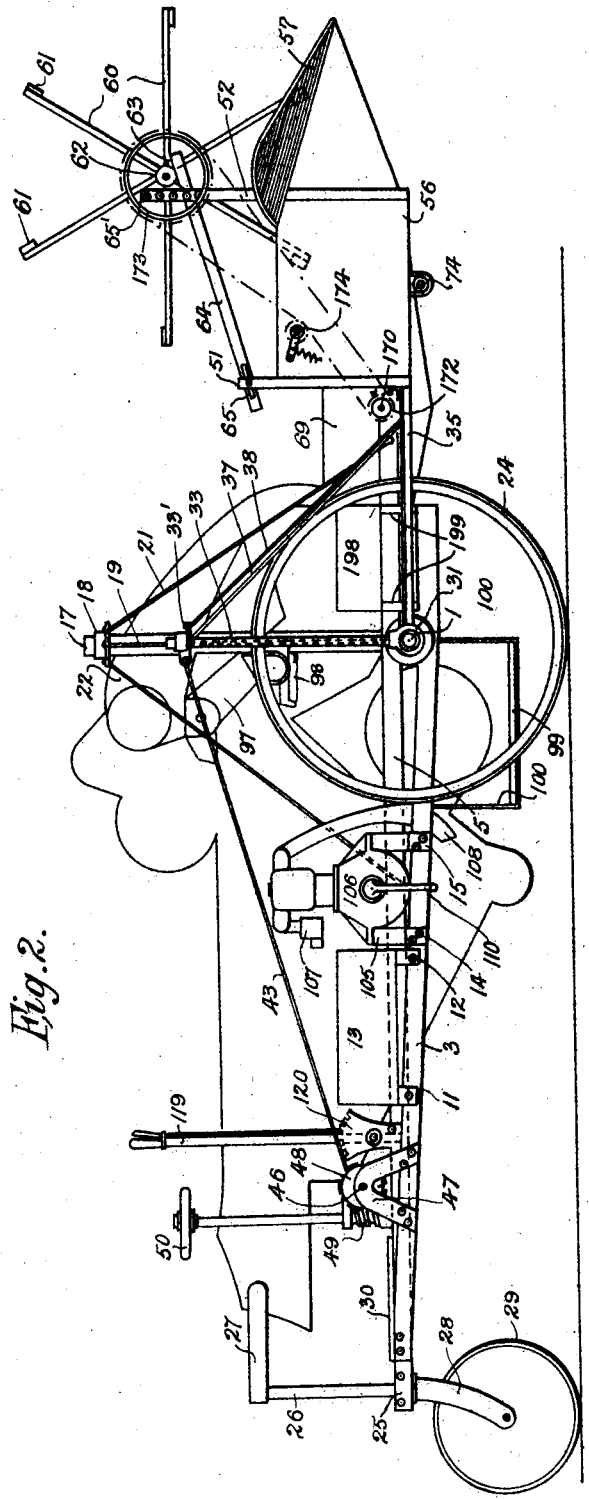
Figure 2 is a right hand side view of the machine.

On the end girders 35 and 40 as shown in Fig. 2 are affixed two vertical pieces 51 and 52, the former at a certain distance from the end and the latter at the extreme end of the said girders. The said vertical pieces, while serving to form the box of the reaper, form supports for the reel which, as in all machines of this kind, is intended to place the head upon the transporter or endless band.

A floor 53 of metal sheeting, tinplate by preference, is placed over the girders in order to avoid contact between them and the endless band 59 which constitutes the transverse transporter and which does not differ substantially from the types of transporter employed in machines of this class. The vertical pieces 51 of the girders of the movable frame are joined by a plank of wood or of some similar substance 54 placed on edge, and transversely to the same and above this plank is fitted a partition, preferably perforated—of wire gauze or similar material—55 which will prevent the heads thrown back by the reel from escaping from the forward portion of the machine, causing them in this manner to fall back upon the endless band 59 of the transporter. At the free end of the reaping device and between the vertical pieces 51 and 52 is fitted a lateral wall 56 which extends in front of the said piece 52 and terminates in a divider board 57. Another divider board 58 is fitted at the opposite extremity of the transporter, which latter end is not closed by a wall, in order to permit the heads transported by the endless band 59 to fall upon the longitudinal transporter which carries them to the mouth of the thrasher.

60 designates a reel which is of the usual type formed by three stars of spokes, the extremities of which are united by rods or laths of wood 61 fitted transversely to the reaper. The said stars of spokes are fitted on an axle 62 which is capable of revolving in a bearing 63 fixed to a metal bar 64. This metal bar 64 at the opposite extremity to the bearing 63 is provided with a longitudinal slot 65 by means of which it may be fixed in any desired position on the vertical piece 51 which for that purpose is perforated in order to permit the insertion of an adjusting screw. The vertical piece 52 is also provided along its length with a series of perforations 65' which permit of the metallic bar 64 being adjusted in any convenient position by means of a bolt or staple. 66 is the comb, which is fixed to the forward edge of the reaper and which may be of any convenient design, and 67 are the saw-knives which by moving to and fro serve to cut the heads and stalks which enter the said comb. These knives may be of any convenient design and their arrangement does not substantially differ from that which is usually employed in this class of machine. Their working will be explained in the general description of the machine.

The transporter or endless band 59 runs on a practically horizontal plane from end to end of the reaper and rises slightly where it approaches the open end of the same from which the heads pass to the transporter which conveys them to the mouth of the thrasher proper. This latter transporter is constructed of two side frames of wood or other appropriate material 69 which are pivoted on an axle 70 which bears a sprocket-wheel 71, which operates the endless chain 73 provided with cross-bars of angle-iron. Another sprocket-wheel 72 mounted on a corresponding axle at the other end of the frame 69 serves to keep tension on the said chain. Fixed to the frame supporting the endless belt 59 is a horizontal tube 74 upon which rests the frame 69, in such a manner that the frame 69 and its transporter 73, although mounted upon a different axis from that of the frame including the bars 35, 36, 39 and 40, is maintained at the same level as the latter frame. When the latter frame is adjusted about the axle 1 the said supporting tube 74 causes the frame 69 to move with said frame. 75 is the concave portion of the thrasher, arranged immediately at the entrance to the thrasher and affixed at 76 to the box of said thrasher. 77 is the drum. Both the drum and the concave portion may be of any suitable design independently of the present invention.

78 represents the entrance pipe for the thrashed grain which by means of the guides 86 is forced to fall upon the straw-removers 79. These are of any suitable design—in the case illustrated being four in number—and supported at one extremity by a set of pivoted links 80 and attached near the other extremity to the diverse gradations of a crank shaft 81. 82 is the discharging outlet for the straw, which outlet is preferably provided with a hood—of cloth in the case illustrated—in order to keep the machine as light as possible.

Beneath the said straw-removers 79 is placed the inclined riddle 84 upon which the grain falls from the straw-removers. This riddle is held in position from outside the box of the thrasher and through holes made for the purpose, by means of spring suspenders 85. Movement is transmitted to the said riddle in a manner which will be explained later. The bottom of the thrasher is inclined in two directions and terminates in a semicircular box, arranged transversely to the machine, in which is placed an endless screw 87 which conveys the thrashed and partly cleaned grain to the foot of an elevator 88 which carries it to the top of the machine. This elevator may be of the bucket type or of any other suitable type employed in thrashing machines. From the top of this elevator the grain is discharged into a chute 89 which conveys it to the interior of the cylindrical sieve 90. This sieve is composed of a barrel of metallic netting or similar material held in position by the ends of the spokes 91 the bushes of which revolve above the axle 92. With the object of transmitting movement to the said circular sieve one of its extremities is provided with a toothed-crown 93 with an opening in its centre, through which opening the grain passes into the interior of the sieve. At its other end the sieve is open in order to permit of the escape of any grains which carry extraneous matter and which are too large to pass through the sieve, these substances falling into a discharger 101 and passing along the chute 102 to fall again into the mouth of the thrasher thus allowing the thrashing to be carried out competely by means of a double operation. Beneath the said cylindrical sieve 90 is placed an endless screw transporter 96 which carries the thrashed and perfectly cleaned grain to an outlet 97 where the grain may be bagged. For greater convenience hooks or similar devices 98 are affixed to the upright or pillar 17 for holding the bags. In order to bag the grain a platform 99 supported by means of hangers 100 from the bars of the machine and the principal axle 1, is placed beneath the outlet 97. The grain is cleaned by means of two air blowing fans, a principal one 94 contained in a cylindrical box behind the riddle 84, which throws a current of air in the direction of the outlet 82 across the said riddle and the straw-removers, and another one 95 also contained in a cylindrical box, which throws a current of air across the cylindrical sieve 90 and along the outlet chute 102. The body of this outlet chute is hinged as is shown at 103 in order to permit of its being cleaned and similarly the cover of the box which contains the thrashing drum is also hinged as indicated at 103' in order to allow access to its interior.

Upon the frame 69 of the side transporter is provided a straw-compressor 104 formed of a sheet of flexible metal bent in the shape of an S which revolves on an axle and which exercises pressure on the cereal resting on the said transporter. The operation of this straw-compressor will be described later.

The general motor of the machine is mounted on longitudinal supports 105 which rest on the cross pieces 14 and 15 already described. This motor, indicated by the number 106 is placed transversely to the machine and has a carburetter 107 and exhaust-pipe 108. It may be of any suitable design and of horse-power corresponding to the size and weight of the machine. 109 designates the shaft of the motor and at the free end of this shaft, which is the end corresponding to the right side of the machine is fixed a crank-handle 110 for starting the motor. The opposite end of the shaft is provided with a fly-wheel 111. 112—112 represent the bearings in which the shaft of the motor revolves and which are fixed in any suitable manner upon the bars of the frame-work. Freely mounted on the shaft 109 is a coupling or clutch wheel 113 which acts to drive the motor wheel 23 through the medium of mechanism hereinafter described. A friction cone 114 of the usual type, which revolves with the shaft 109 and is capable of sliding along the same, can be put into action by means of a fork 115 at the end of the horizontal lever 116. The lever 116, by the action of a spring 117, tends constantly to maintain the friction cone 114 in engagement with the wheel 113. A cable 118 is fixed to the said lever and after passing over guide-pulleys is attached to the lower end of a lever 119 pivoted at an intermediate point and capable of being firmly fixed in any desired position by means of a toothed sector 120 and the usual accessory devices. By means of the said lever 119, the lever 116 can be caused to overcome the action of the spring 117 and bring about the disengagement of the free wheel 113 and the friction-cone 114. Fixed to the coupling-wheel 113 is a pinion wheel 121 meshing with a larger wheel 122 mounted, in a manner which allows it to revolve upon a shaft 123, which turns in bearings 124 carried by the supports 125. Upon this same shaft 123 there is fixed another pinion wheel 126 of smaller diameter than 122 which in turn engages with another similar wheel 126ª of larger diameter mounted on an intermediate shaft 128. Fixed to the latter shaft is a sprocket-wheel 129 which transmits movement by means of a chain, to a toothed crown 130 fixed to the spokes of the motor wheel.

The arrangement of these reducing gears permits of the employment of high velocity motors, which are more economical in working, and at the same time the simplicity with which the motor may be engaged and disengaged as regards the progressive movement of the machine makes it unnecessary to employ high-salaried operators.

From the foregoing description it will be clearly evident that the movement of the machine is always in a forward direction, there being no special device for backing the machine by means of the motor. It has been considered more convenient to simplify the machine in this respect and thereby avoid increasing the weight and the employment of additional gears, for the reason that as these machines generally work in open country where there is plenty of space available, it is always possible to turn the machine completely round.

On the same shaft 109 of the motor is mounted a similar coupling wheel 131 which serves to transmit the movement necessary for the working of the various parts of the machine. This wheel is mounted free on the said shaft and has attached to it a chain-wheel 139 which is capable of revolving with it. A friction-cone of the usual type 132, capable of revolving with the shaft 109 and of sliding along the same in a slot made for the purpose, can be put into action by means of a fork 133 on the end of a horizontal lever 134, which by the action of a spring 135 tends to keep the parts 131 and 132 continually engaged. A cable 136 is attached to the said lever and passing over a guide-pulley is attached to the lower end of a vertical lever 137 pivoted at an intermediate point and which may be firmly fixed in any desired position by means of a toothed-sector 138 and the usual accessory devices. By means of this latter lever 137 the cable 136 may be pulled for moving the lever 134, thus overcoming the resistance of the spring 135 and permitting the wheel 131 to disengage the friction-cone 132.

By means of a chain the movement of the toothed wheel 139 is transmitted to a similar wheel 140 arranged at the internal extremity of the shaft 141 which is firmly affixed to the drum 77 of the thrasher. This shaft is the drive shaft of the thrasher and header and from it movement is transmitted to the other working parts of the machine. On the external end of the said shaft 141 are fitted two chain wheels 142 and 143. The chain wheel 142 transmits movement by means of a chain 142ᵃ to the chain wheel 145 on the end of the shaft 144 which carries the principal fan blower 94. On the opposite end of the said shaft 144, corresponding to the inside surface of the thrasher, is fitted a pulley 146 which by means of a crossed belt 147 sets in motion a similar pulley 148 fixed on the end of a shaft 149 which carries the secondary fan blower 95 in the upper part of the machine.

The chain wheel 143 of the main shaft 141 moves, by means of a chain 143ᵃ, the chain wheel 150 which is of greater diameter and is mounted on a secondary shaft 151 suitably supported by bearings from the framework. On this same shaft, on the internal side of the wheel 150 is mounted a toothed wheel 152 and on the external side a chain wheel 153.

The toothed wheel 152 engages with a toothed wheel 154 fitted on the external end of the shaft 70, which as has already been explained is the motive shaft of the transporter to the mouth of the thrasher. On the external side of the said toothed wheel 154 is fitted on the same shaft 70 a chain wheel 155 which by means of a chain moves an intermediate chain wheel 156, which latter in turn moves by a chain another chain wheel 157 which carries firmly fixed on its shaft a toothed wheel 158 which engages with a toothed wheel 159 firmly fixed on the shaft 160 corresponding to the straw-compressor 104.

On the opposite free end of the shaft 70 is fixed a bevelled pinion 161 which engages with another bevelled pinion 162 fixed to the end of a shaft 163 suitably mounted in bearings along one of the frame-bars of the transporter. This shaft is joined at its extremity by an articulated coupling 164 with the extremity of another shaft 165 which passes through the transporter of the reaper and ends in a crank 166 as shown in Fig. 6 which by means of a rod 167 transmits a to and fro movement to the knives of the reaper.

On the same shaft 165 and adjacent to the rear edge of the reaper is mounted another bevelled pinion 168 which engages with a bevelled pinion 169 fitted on the shaft 170 which turns in bearings 171 and passes along the length of the rear edge of the reaper body. On the free end of the said shaft 170 is fitted a chain wheel 172 which by means of a chain sets in motion a chain wheel 173 which is fixed to the axle 62 of reel 60. In order to keep the required tension on the said chain, a tension roller 174 compressed by a spring, or any other suitable device, is arranged on the outer face of the lateral wall 56.

On the said shaft 170 is mounted a bevelled pinion 175 which engages with another bevelled pinion 176 fitted on the outer extremity of the shaft 177 which forms the motive shaft of the endless band.

By the arrangement of parts which has just been specified and the corresponding reduction in the speeds, a synchronous movement of all the parts of the machine is obtained as well as the suitable feeding of the reaped heads to the thrasher.

From the chain wheel 153 and by means of a chain movement is conveyed to the chain wheel 178 fixed to the outer extremity of the intermediate shaft 179. On the said shaft is also fitted a chain wheel 180 and a toothed wheel 181. The chain wheel 180, by means of a chain moves the chain wheel 182 mounted on the end of the upper shaft 183 of the elevator 88 while the pinion or toothed wheel 181 engages with another toothed wheel 184 mounted on the end of the shaft 185 of the upper endless screw conveyor 96. On this shaft 185 is mounted a chain wheel 186 which by means of a chain engages with the crown wheel 93 of the cylindrical sieve 90.

From the upper shaft 183 of the elevator movement is transmitted by means of chains to toothed wheels 187 fitted on the lower shaft 188 of this elevator, which is at the same time the shaft of the lower endless screw 87. On the external free end of this shaft, corresponding to the internal side of the thrasher, is fitted a chain wheel 189 which by means of a chain as shown in Figs. 3 and 4 moves another chain wheel 190 mounted on the free end of the shaft 191 which bears the cranks 81 of the straw-removers 79, which in this manner receive the revolving motion transformed to a movement to and fro.

Figure 3:
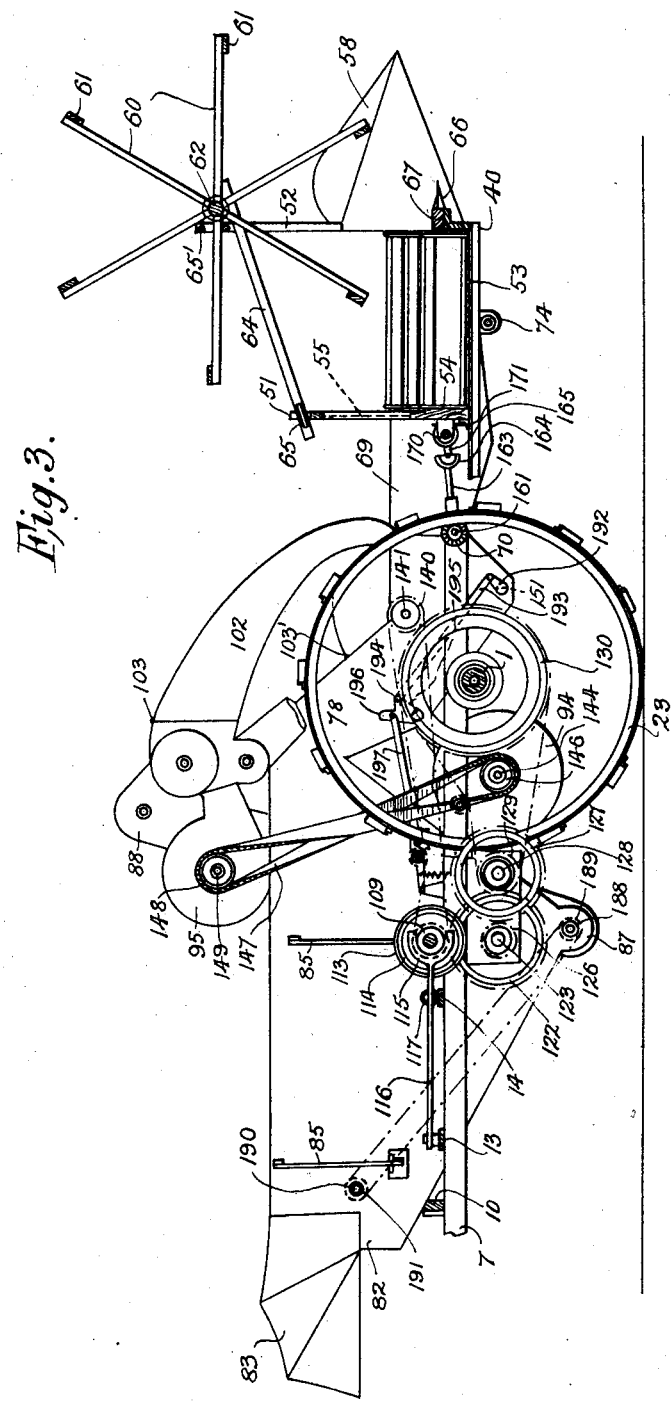
Figure 3 is a longitudinal section of the machine along the line A—B of Figure 1.

At the inner extremity of the shaft 151 as best shown in Fig. 3 is a crank 192 connected to a rod 193 which transmits movement to another crank 194 fitted on a shaft 195 mounted suitably in bearings on the frame and which passes through the chassis of the thrasher. At the ends of the said shaft 195 are mounted cranks 196 which by means of rods 197, arranged on each side of the machine, transmit their alternate to and fro movement to the riddle 84, to the extremities of which are connected the said rods 197.

The said crank 196 is provided with holes along its length by means of which the range of movement of the riddle 84 may be regulated at will.

On the chassis of the machine, in front of the space occupied by the motor, is placed the naphtha tank 198 or tank for any other fuel for the consumption of the motor, this tank being fixed to the bar 3 by one of its sides and by supports 199 attached to the main axle 1.

It is evident that in the machine in accordance with the present invention various modifications of construction and of detail may be introduced, without thereby departing from the sphere of the invention, which is clearly determined in the clauses of the claims which follow this specification. Thus for example in the various chains there may be introduced—and it is preferable to do so—tension rollers in order to facilitate their better working and obviate their escape, and other details may be introduced without departing from the invention.

The operation of the machine according to the present invention is exceedingly simple and after the foregoing explanations this is clearly evident. The machine fulfills substantially the following objects: it is self-moving as regards its transportation and internal working, all these movements being transmitted from a main shaft by means of appropriate couplings which permit of the machine travelling without at the same time operating internally, which represents a considerable saving in power. It comprises a heading apparatus, transporters, a thrasher, cleaners and separators and finally an arrangement for bagging the grain.

The working is as follows:—Moving the lever 119 the machine is engaged and placed in motion in a forward direction by means of the transmitting arrangements specified, the machine's direction being guided by means of the steering wheel 29 operated by the steering lever 27 in the manner usual in agricultural machines. When the height of the front frame which bears the cutting knives and combs has been regulated by means of the hand wheel 50 and the connections specified, the wheat is cut by the said knives and thrown by the reel 60 which revolves—once the engagement of 131 and 132 has been produced by the movement of the lever 137—upon the endless band 59 which conveys it to the lateral transporter 73 upon which the cereal is pressed by means of the straw-compressors 104 in order that it may enter the mouth of the thrasher in as flat a position as possible. After the cereal has been treated by the drum and concave portion of the thrasher in the usual manner it passes over the straw-removers where the grain is separated from the straw, the former falling upon the riddle 84 through which it passes. The straw and dust are expelled by the action of the main fan 94 through the opening in the machine 82. The grain is collected in the bottom of the thrasher where it is taken by the endless screw 87 which conveys it to the foot of the elevator 88 by which it is raised and discharged down the chute 89 to the interior of the cylindrical sieve 90. This cylindrical sieve during its rotary movement is subjected to the action of the current of air emitted by the secondary fan blower 95 which expels any residue of dust which the grain may yet contain, which dust passes into the funnel 102. The particles which may be too large are expelled through the open discharge end of the said sieve and are also impelled by the same current of air along the funnel 102. The grain falls directly upon the endless screw 96 which conveys it to the discharge outlet 97 where the grain is bagged in any convenient manner, for example by means of bags suspended on the hooks 100 arranged for the purpose. Once the grain has been bagged the bags may be allowed to fall at the rear of the machine through the space between the platform 99 and the lower support of the motor 106.

The substances which pass along the funnel 102 fall again into the mouth of the thrasher and return through the same, being again subjected to the same series of operations, which permits of a complete and perfect thrashing of the grain.

Having thus particularly described and determined the nature of the present invention and the manner of its operation, I declare that what I claim as my invention and exclusive right is:

1. A self-propelled three-wheeled heading and thrashing machine comprising a main frame having a steering wheel at its rear end, an axle extending transversely across its front end a driving wheel mounted on the central portion of the axle, a supporting wheel mounted on one end of the axle, a portion of the main frame being mounted on the other end of said axle, a thrashing mechanism frame extending longitudinally of the frame and located on the side of the frame opposite that having the supporting wheel, a motor mounted on the side of the frame having the supporting wheel and counter-balancing the weight of the thrashing mechanism, a movable frame pivotally mounted on the axle between the driving wheel and the end of the axle which carries the supporting wheel, a heading mechanism supported by the movable frame, mechanism operatively connecting the motor with the thrashing mechanism, heading mechanism and driving wheel, and means for adjusting the movable frame about said axle.

2. A mechanism as defined in claim 1 having a transporter for the heading mechanism and an endless conveyor for the thrashing mechanism, said transporter discharging on to said conveyor.

3. A machine as defined in claim 1 having a conveyor frame pivotally connected to the thrashing mechanism frame and carrying an endless conveyor, a transporter for the heading mechanism discharging onto the endless conveyor, the axis of the pivotal connection of the conveyor frame with the thrasher frame being parallel to the main frame axle, and means connecting the movable frame with the conveyor frame for causing the latter frame to partake of movements of the former.

4. A machine as defined in claim 1 having a conveyor frame pivotally connected to the thrashing mechanism frame and carrying an endless conveyor, a transporter for the heading mechanism discharging onto the endless conveyor, the axis of the pivotal connection of the conveyor frame with the thrasher frame being parallel to the main frame axle, and means connecting the movable frame with the conveyor frame for causing the latter frame to partake of movements of the former, said last named means consisting of a horizontal tube fixed to the movable frame and upon which the conveyor frame rests.

5. A machine as specified in claim 1, in which the frame is formed by four bars mounted on sleeves fitted to the axle, three of which unite at the rear of the machine and the other terminating at the body of the thrasher, the latter bar being joined transversely to the former by means of a crossbar, a pillar mounted upon the supporting axle, and stays extending from the pillar and reinforcing the said bars, said stays also supporting the upper part of the thrasher body, substantially as described and for the purpose specified.

6. A machine as defined in claim 1, in which the movable frame includes two uprights mounted on sleeves capable of turning about the axle, girders extending from the sleeves and supporting the heading mechanism, ties connecting the upper ends of the uprights to said girders, a worm gear operated drum, cables having their ends connected to the uprights and drum, and means for actuating said worm gear.

7. A combined harvesting and thrashing machine including a main frame having a fixed axle, a movable frame movable about said axle and carrying a cutting and transporting mechanism, a thrashing mechanism supported by the main frame and axle, a conveyor frame connected to the thrashing mechanism and movable about an axis extending parallel to the axle, an endless conveyor supported by the conveyor frame and receiving the material discharged by the transporting mechanism, and a tube carried by the movable frame, said conveyor frame resting on said tube and moving with the movable frame.

8. A machine as defined in claim 7 in which the axis of the conveyor is provided with a gear, a shaft including a universal joint, for driving the cutting and transporting mechanism, a gear mounted on said shaft and meshing with the axis gear, a motor mounted on the main frame, and means operatively connecting the motor and axis.

9. A machine as defined in claim 1, in which the motor has a shaft extending transversely of the line of draft, a plurality of wheels loosely mounted on said shaft and each carrying a fixed toothed wheel, cones slidably mounted on the shaft and fixed to rotate with the same, forked levers pivotally mounted on the mechanism frame and engaging said cones, springs for holding the cones in engagement with the loose wheels, hand levers, cables connecting the hand levers to the first mentioned levers, a shaft driven by the toothed wheel of one of the loosely mounted wheels, mechanism connecting the last shaft with the driving wheel, and mechanism connecting the toothed wheel of the other loosely mounted wheel with the thrashing and heading mechanism.

In testimony whereof I have signed my name to this specification in the presence of two subscribing witnesses.

JOSÉ FRIC.

Witnesses
 E. BARTH,
 J. H. AINSWORTH.